United States Patent [19]

Ishikawa et al.

[11] Patent Number: 5,727,235
[45] Date of Patent: Mar. 10, 1998

[54] ZOOM STROBE DEVICE

[75] Inventors: Tuyoshi Ishikawa; Yuji Ogawa, both of Tokyo, Japan

[73] Assignee: Asahi Kogaku Kogyo Kabushiki Kaisha, Tokyo, Japan

[21] Appl. No.: 687,215

[22] Filed: Jul. 25, 1996

[30] Foreign Application Priority Data

Jul. 26, 1995 [JP] Japan ................... 7-210052
Apr. 10, 1996 [JP] Japan ................... 8-113145

[51] Int. Cl.⁶ ............................. G03B 15/03
[52] U.S. Cl. ........................ 396/62; 396/175
[58] Field of Search ............. 354/149.1, 149.11, 354/195.1, 195.12; 396/72, 155, 175, 176, 177, 200, 61, 62

[56] References Cited

U.S. PATENT DOCUMENTS

| | | | |
|---|---|---|---|
| 4,914,461 | 4/1990 | Hori | 354/149.1 |
| 4,916,475 | 4/1990 | Hori | 396/62 |
| 4,944,030 | 7/1990 | Haraguchi et al. | 396/62 |
| 4,951,074 | 8/1990 | Ueda | 354/149.1 |
| 5,280,315 | 1/1994 | Nomura et al. | 396/175 |

*Primary Examiner*—Eddie C. Lee
*Attorney, Agent, or Firm*—Greenblum & Bernstein P.L.C.

[57] ABSTRACT

An improved zoom strobe device is provided. When a zoom lens changes its focal length from a first length to a second length, the zoom strobe device changes its illumination angle from its minimum angle to maximum angle when the focal length of the zoom lens is changed from the first length to a third length which is smaller than the second length but greater than the first length, and then the strobe device maintains the maximum illumination angle when the focal length of the zoom lens changes between the third length and the second length.

11 Claims, 8 Drawing Sheets

ZOOM STROBE DEVICE

BACKGROUND OF THE INVENTION

The present invention relates to a zoom strobe device employed in a camera having a zoom lens, and more specifically to a zoom strobe device capable of changing illumination angle in accordance with the change of the focal length of the zoom lens.

Conventionally, a zoom strobe device changes the illumination angle within a predetermined range as the focal length of a zoom lens changes. This type of zoom strobe device has, for example, a lens and a discharging tube for emitting light, and a reflector for reflecting light emitted by the discharging tube towards the reflector. The illumination angle of the strobe device is determined depending on the positional relationship between the lens, the discharging tube and the reflector that defines the angle. As the zoom lens moves (i.e., the focal length of the zoom lens changes), the positional relationship of the lens, the discharging tube and the reflector is changed so that the illumination angle changes in accordance with the change of the angle of image field (i.e., the change of the focal length of the zoom lens).

An example of a conventional zoom strobe device is constructed such that the positional relationship between the discharging tube and the reflector is fixed. In this case, the distance between the lens and the reflector is shortest when the focal length of the zoom lens has a minimum value, while the distance between the lens and the reflector is furthest when the focal length of the zoom lens has a maximum value. In this type of the zoom strobe device, if the focal length of the zoom lens is between the minimum and the maximum values, the distance between the lens and the reflector is determined in accordance with the focal length of the zoom lens.

Recently, users desire that the zooming range, i.e., the changeable range of the focal length of the zoom lens, is increased, and zooming ranges have increased dramatically. Another requirement of the users for the zoom lens cameras is that the bodies of the cameras are made compact. Since the zoom strobe device built in the zoom lens camera has a simple structure as described above, if the camera body becomes compact, the range of the illumination angle of the zoom strobe device is restricted because the changeable range of the distance between the lens and the reflector is limited by the size of the camera body. Under such a situation, if the changeable range of the focal length of the zoom lens becomes wider, the illumination angle of the zoom strobe device may not follow the change of the photographing angle.

FIG. 10 shows an example of such a situation. FIG. 10 shows change of the photographing angle (i.e., angle of view) of the camera or the illumination angle of the zoom strobe device with reference to the change of the focal length of the zoom lens. The change of the photographing angle is indicated by a line P, and the change of the illumination angle of the zoom strobe device is indicated by a line L.

Assume that, in a camera, the focal length of the zoom lens can be changed between A and B. In this case, the photographing angle of the zoom lens changes between PW and PT. Note that the point PW corresponds to the wide extremity and a point PT corresponds to the tele extremity of the zoom lens. Corresponding to the change of the focal length of the zoom lens, the strobe device changes its illumination angle between points LW and LT along the straight line L. As shown in FIG. 10, the point PW and the point LW are relatively close. However, the point PT and the point LT are relatively far apart from each other. The point LT cannot be any closer to the point PT because the camera body should be made compact and the distance between the reflector and the lens cannot be elongated, as described above.

As shown in FIG. 10, when the zoom lens is located at the wide extremity (when the focal length of the zoom lens is smallest), the photographing angle PW of the zoom lens and the illumination angle LW of the zoom strobe device are close. As the focal length of the zoom lens becomes greater, the illumination angle of the strobe device is set greater than is necessary, i.e., much greater than the photographing angle of the zoom lens (i.e., line P). Especially when the zoom lens is located at an intermediate range between the wide range and the tele range, although the illumination angle required in the intermediate range is within the changeable range of the illumination angle of the zoom strobe, the actual illumination angle, as shown in FIG. 10, is much greater than the photographing angle (i.e., the line L and the line P are far apart from each other). Thus, the light emitted by the discharging tube is not efficiently used.

SUMMARY OF THE INVENTION

It is therefore an object of the invention to provide an improved zoom strobe device which can utilize the light emitted by the discharging tube as efficiently as possible within the changeable range of the illumination angle.

For the above object, according to the invention, there is provided a zoom strobe device employed in a zoom lens camera, the zoom strobe device being capable of changing illumination angle in accordance with change of focal length of a zoom lens of the camera, the zoom strobe device comprising:

a light source for emitting light;

a lens for refracting the light emitted by the light source;

a reflector provided on an opposite side of the lens with respect to the light source, the reflector reflecting light emitted by the light source to be directed to the lens; and a drive mechanism for changing the illumination angle, wherein the focal length of the zoom lens changes from a first focal length to a second focal length which is greater than the first focal length, and wherein the drive mechanism changes the illumination angle when the focal length of the zoom lens changes between the first focal length and a third focal length which is greater than the first focal length and smaller than the second focal length, while the drive mechanism maintains the illumination angle when the focal length of the zoom lens changes between the third focal length and the second focal length.

Optionally, the illumination angle may be changeable within a predetermined changeable angle range, and when the focal length is the first focal length, the illumination angle can be set to be a maximum angle within the changeable angle range, and when the focal length is the second focal length, the illumination angle can be set to be a minimum angle within the changeable angle range.

Further, the change in the illumination angle may be made substantially proportional to the change of the focal length of the zoom lens as the focal length changes between the first and third focal lengths.

Alternatively, change of the illumination angle corresponds to the change of a photographing angle of the zoom lens when the focal length changes between the first and third focal lengths. By adjusting the characteristic of the lens and the driving mechanism of the reflector, it may be possible to make the illumination angle almost coincide with the photographing angle within the changeable range of the illumination angle.

Specifically, a difference between the photographing angle (i.e., the angle of view) and the illumination angle when the focal length is set within a range between the first focal length and the third focal length, remains substantially unchanged.

Further optionally, a difference between a photographing angle of the zoom lens and the illumination angle when the focal length is one of the first and the third focal lengths is smaller than a difference between the photographing angle and the illumination angle when the focal length is within a range between the third focal length and the second focal length. Furthermore, for any focal length of the zoom lens, the illumination angle according to the invention is closer to the photographing angle than the case where the illumination angle is changed proportionally to the change of the focal length of the zoom lens.

Still optionally, the reflector may be movable in a direction of an optical axis of the lens, and wherein the drive mechanism includes a projected member connected to the reflector, and a cam plate having a cam groove to be engaged with the projected member. The cam plate is movable in a direction perpendicular to the direction of the optical axis of the lens.

Further, the cam plate moves in accordance with the change of the focal length of the zoom lens.

According to another aspect of the invention, there is provided a zoom strobe device employed in a zoom lens camera, the zoom strobe device being capable of changing illumination angle in accordance with change of focal length of a zoom lens of the camera, the zoom strobe device comprising:

a light source for emitting light;

a lens for refracting the light emitted by the light source;

a reflector provided on an opposite side of the lens with respect to the light source, the reflector reflecting emitted by the light source to be directed to the lens; and a drive mechanism for changing distance between the reflector and the lens in order to change the illumination angle, wherein the drive mechanism changes the distance between the reflector and the lens when the focal length of the zoom lens changes between a minimum focal length and a predetermined focal length which is greater than the minimum focal length and smaller than a maximum focal length of the zoom lens, while the drive mechanism maintain the distance between the reflector and the lens when the focal length of the zoom lens changes between the predetermined focal length and the maximum focal length.

BRIEF DESCRIPTION OF THE ACCOMPANYING DRAWINGS

DESCRIPTION OF THE EMBODIMENTS

Figure 1:
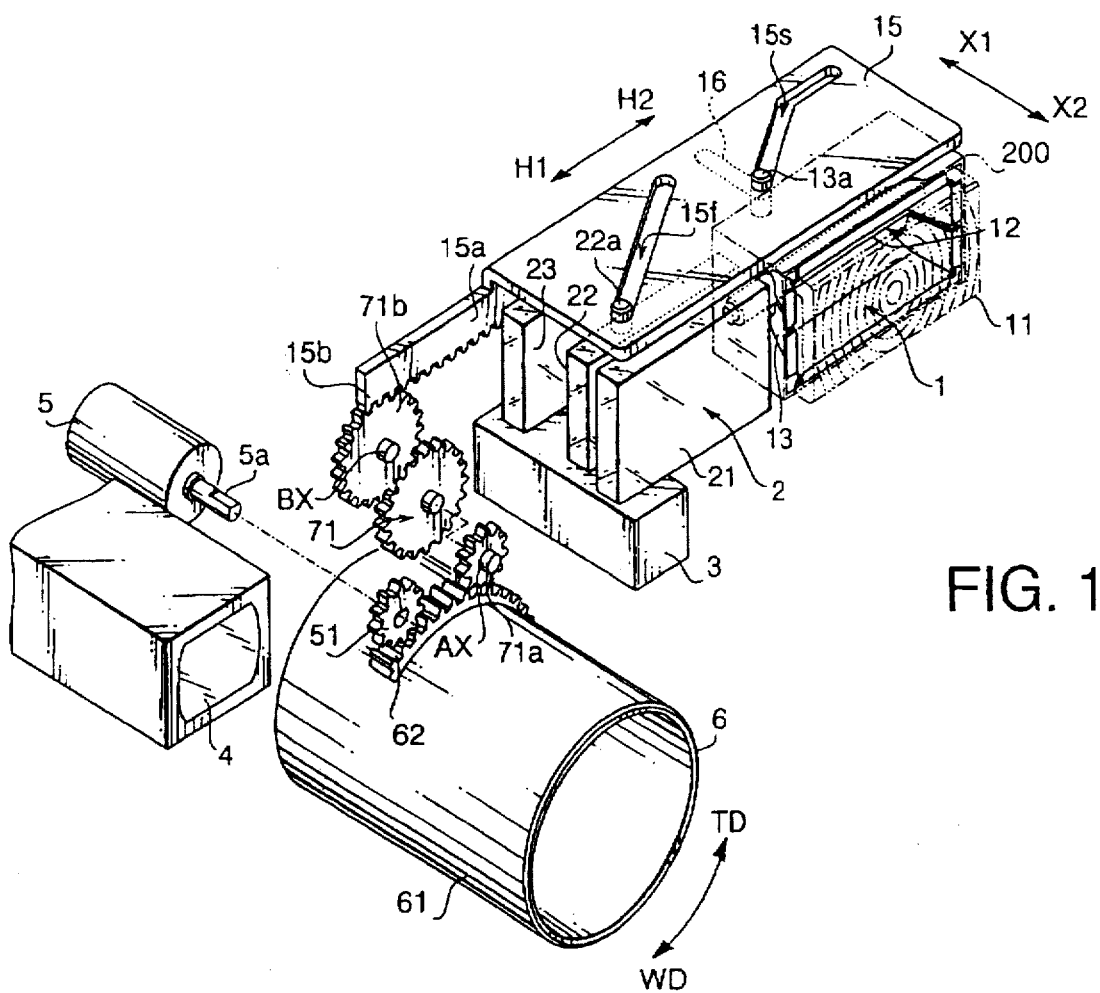
FIG. 1 is a schematic perspective view of a mechanism for changing the illumination angle of the zoom strobe device in accordance with the change of the focal length of the zoom lens, which is the embodiment of the present invention.

FIG. 1 is a schematic perspective view of a mechanism for changing the illumination angle of the zoom strobe device in accordance with the change of the focal length of the zoom lens which is employed in a lens shutter camera (referred to as a zoom lens camera hereinafter).

As shown in FIG. 1, in the zoom lens camera, provided are a zoom strobe device 1, a finder 2, an infrared light emitting unit 3 and receiving unit 4 for range finding, a zoom lens block 6, and a zoom lens driving motor 5.

The zoom strobe device 1 has: a cover plate 11 which is fixed at a strobe light emitting window formed on a front surface of a camera (not shown); a discharging tube 12 for emitting strobe light; and a reflector 13 for collecting and reflecting the light emitted by the discharging tube 12 to be directed towards an object through the cover plate 11. The cover plate 11 is a Fresnel lens having a predetermined positive power. The discharging tube 12 is supported by the reflector 13. In the embodiment, the reflector 13 and the discharging tube 12 are accommodated in a casing 200 and move along the optical axis of the strobe device with respect to the cover plate 11 (i.e., the Fresnel lens 11) to change the distance therebetween and thereby changing the illumination angle of the strobe device 1.

Figure 9:
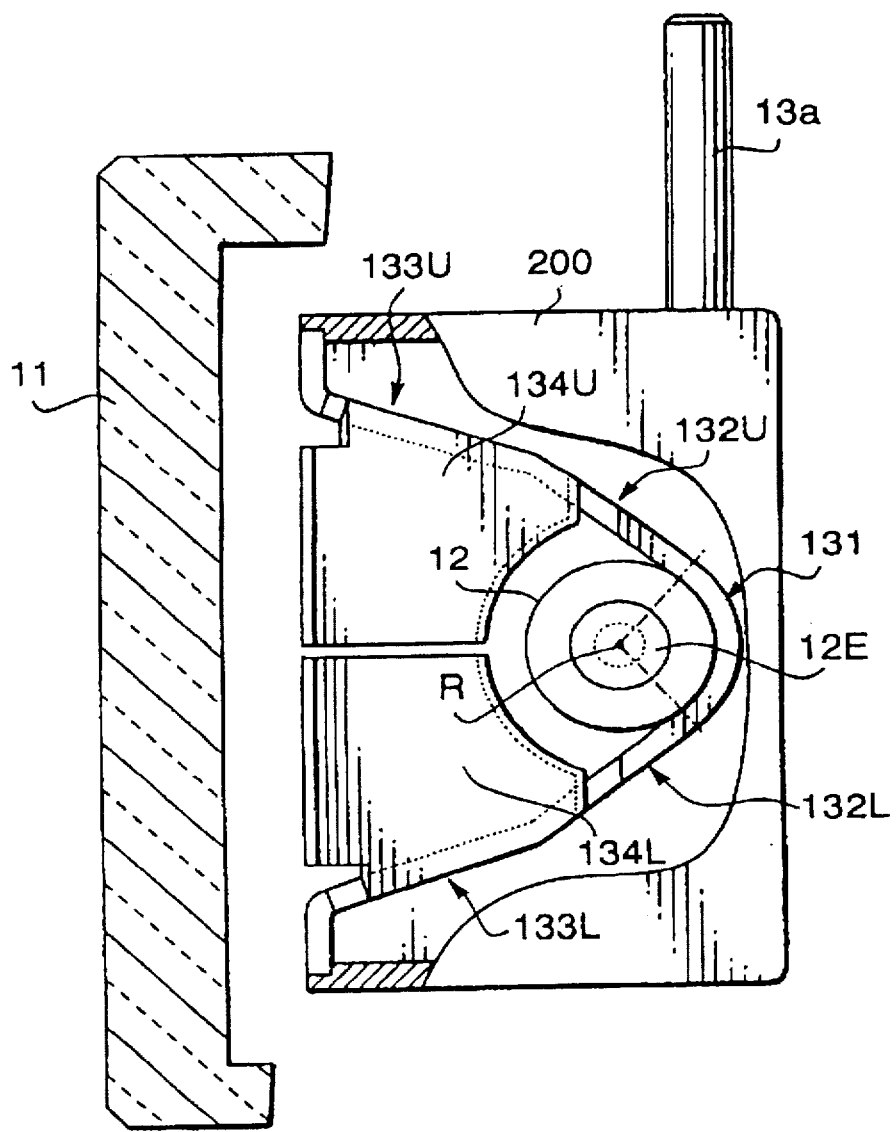
FIG. 9 is a schematic side view of the reflector.
Figure 10:
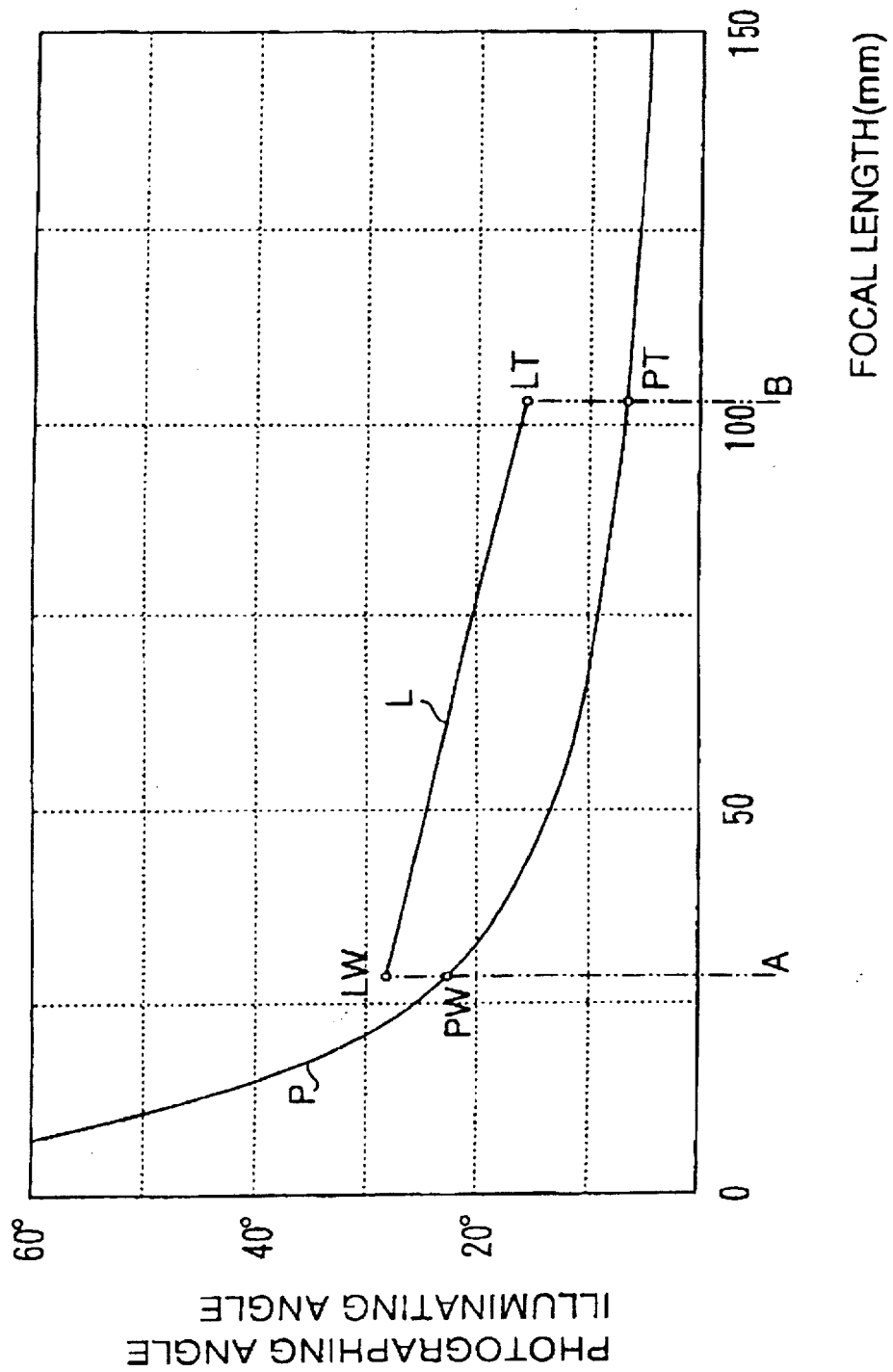
FIG. 10 is a graph showing the change of the illumination angle with respect to the change of the focal length of the zoom lens in a conventional zoom strobe device.

FIG. 9 is a side view showing the appearance of the reflector 13.

The reflector 13 supports the discharging tube 12 having a cylindrical shape. The reflector 13 has surfaces 131, 132U, 132L, 133U and 133L, each of which extends parallel to the central axis R of the discharging tube 12, and side surfaces 134U and 134L which extend perpendicular to the central axis R of the discharging tube 12. The surface 131 is a cylindrical surface which curves along the circumferential outer surface of the discharging tube 12, the center of the curvature of the surface 131 is the central axis R of the discharging tube 12. The surfaces 132U and 132L, each of which is connected from the surface 131, is a tangential plane with respect to the outer surface of the discharging tube 12. That is, if the reflector 13 and the discharging tube 12 are cut with a plane perpendicular to the central axis R of the discharging tube 12, the cross section of the discharging tube 12 is seen as a circle and the cross sections of the surfaces 132U and 132L are seen as tangential lines of the circle-shaped cross section of the discharging tube 12. On the outer side of the surfaces 132U and 132L, plane surface 133U and 133L are further connected, respectively. The shape of the reflector surfaces 133U and 133L are symmetrical, with respect to a plane including the central line R of the discharging tube 12. Angle formed between the surfaces 132U and 132L are greater than the angle formed between the surfaces 133U and 133L. The side surfaces 134U and 134L, which are provided both side of the reflector 13, are formed by bending the side portion of the surfaces 132U, 133U, 132L and 133L. In the direction parallel to the central line R of the discharging tube 12, the length of the curved surface 131 is shorter than the lengths of the outer ends (i.e., the cover plate side ends) of the surfaces 133U and 133L. The length of the surfaces 131, 132U (132L), and 133U (133L) in the direction parallel to the central line R of the discharging tube 12 gradually increases from the curved surface 131 to the outer end of the surface 133U (133L).

The reflector 13 and the discharging tube 12 are accommodated in a casing 200. On the top surface of the casing 200, a pin 13a is projected. Electrodes 12E are provided at both axial ends of the discharging tube 12. The electrodes 12E are protruded from openings formed on the side surfaces of the casing 200.

Note that the shape of the reflector 13 is not necessarily limited to the above described shape. As far as the illumination angle changes in accordance with the relative movement of the cover plate (the Fresnel lens) 11 and the reflector 13, any type of reflector can be used.

As described above, the reflector 13 and the discharging tube 12 are accommodated in the casing 200.

As shown in FIG. 1, the finder 2 has an object side lens 21, a magnification changing lens 22 and an eyepiece lens 23. The magnification changing lens 22 moves in a direction of the optical axis of the finder 2 in accordance with the movement of the zoom lens to change the magnification of the finder 2.

The infrared light emitting unit 3 and receiving unit 4 are used for performing so-called active range finding. Infrared emitted by the infrared light emitting unit 3 and reflected by an object is received by the infrared light receiving unit 4, and then in accordance with a triangulation method, the distance from the camera to the object is determined.

The zoom lens block 6 accommodates the zoom lens. When the zoom motor 5 rotates, a pinion gear 51 fixed on the spindle shaft 5a of the zoom motor 5 drives a gear 62 which is formed on the surface of a cam ring 61. Then, due to the engagement of a cam formed on the cam ring 61 with a cam follower, the zoom lens moves along its optical axis and zooming is performed. An example of the zoom lens driving mechanism can be found in U.S. Pat. No. 4,944,030, the teaching of which is incorporated herein by reference.

With the gear 62 formed on the cam ring 61, a pinion gear 71a fixed on the input shaft AX of the reduction gear train 71 is engaged. Above the zoom strobe device 1 and the finder 2, a cam plate 15 is provided. The cam plate 15 is slidable in the direction H1 and H2 indicated in FIG. 1. The rear end of the cam plate 15 is bent to be a L-shaped bent portion 15a. At the end of the bent portion 15a, a rack 15b is formed. The rack 15b engages with the pinion gear 71b which is fixed to the output shaft BX of the reduction gear train 71.

With the above construction, when the zoom motor 5 is driven and the pinion gear 51 rotates, due to the engagement of the pinion gear 51 with the gear 62, the cam ring 61 rotates and the zooming of the lens is performed. If the cam ring 61 is rotated in direction indicated by arrow WD, the zoom lens moves towards the wide extremity, and if the cam ring 61 is rotated in the direction indicated by arrow TD, the zoom lens moves towards the tele extremity. As the cam ring 61 rotates, due to the engagement of the gear 62 and the pinion gear 71a, the pinion gear 71a rotates, and the pinion gear 71b rotates through the reduction gear train 71. When the pinion gear 71b rotates, as the pinion gear 71b engages with the rack 15b, the cam plate 15 slides in the direction H1 or H2. If the cam ring 61 rotates in the direction of arrow TD, the cam plate 15 moves in the direction H1, and if the cam ring 61 rotates in the direction of WD, the cam plate 15 rotates in the direction of H2.

The magnification varying lens 22 of the finder 2 is made movable along the optical axis thereof as guided by a guide mechanism (not shown). On the top surface of the lens frame of the magnitude varying lens 22, a projection 22a engaging with a cam groove 15f formed on the cam plate 15 is provided. When the cam plate 15 moves in the direction H1 or H2, due to the engagement of the projection 22a with the cam groove 15f, the magnification varying lens 22 moves along its optical axis to vary the magnification of the finder 2.

Another cam groove 15s to be used for changing the illumination angle of the zoom strobe device 1 is also formed on the cam plate 15. The reflector 13 of the zoom strobe device 1 is movable in the direction of the optical axis of the cover plate (i.e., the Fresnel lens) 11. The pin 13a provided on the casing 200 of the reflector 13 engages with the cam groove 15s. The pin 13a is also engaged with an elongated hole 16 which is formed on the camera body and extends along the optical axis of the photographing lens. Constructed as above, the cam plate 15 moves in H1 and H2 directions in FIG. 1, the reflector moves in X1 and X2 directions.

Therefore, when the zoom motor 5 is driven, the cam ring 61 rotates in TD or WD direction, and the cam plate 15 slides in H1 or H2 direction. As the cam plate 15 moves, the magnification varying lens 22 and the reflector 13 move in X1 or X2 direction.

Figure 2:
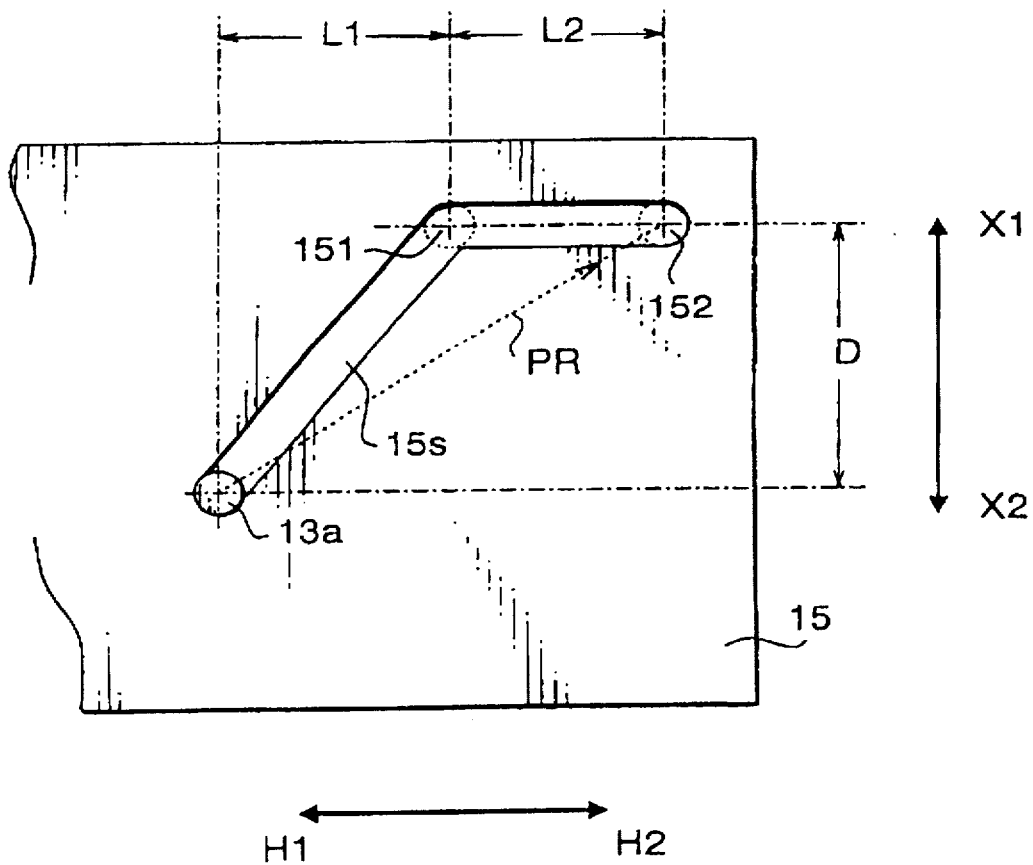
FIG. 2 shows a shape of a cam which is used for moving a reflector, which is employed in a first embodiment of the invention.

FIG. 2 is a top view of a part of the cam plate 15 where the cam groove 15s is formed.

As described above, when the cam plate 15 is moved in H1 or H2 direction, the cam groove 15s moves with respect to the projection 13a, in H1 or H2 direction. For example, the cam plate 15 as shown in FIG. 2 is capable of moving in H1 direction by the amount corresponding to the sum of lengths of areas L1 and L2. The cam groove 15s inclines with respect to the moving direction of the cam plate 15 in the area L1, and the cam groove 15s is parallel to the moving direction of the cam plate 15 in the area L2. Therefore, when the cam groove 15s as shown in FIG. 2 moves in H1 direction by the amount equal to the length of L1, the projection 13a moves in X1 direction, and is located at a bending portion 151 of the cam groove 15s. Since the projection 13a moves in X1 direction, the reflector 13 also moves in X1 direction and the illumination angle of the strobe device 1 becomes smaller.

FIG. 2 shows a status that the zoom lens is located at its wide extremity (i.e., the focal length of the zoom lens is smallest). In this state, the illumination angle of the strobe device 1 is maximum. When the projection 13a reaches the bending portion 151, the illumination angle of the zoom strobe device 1 is minimum, although the focal length of the zoom lens is not the maximum value at this stage. In other words, in the zoom strobe device 1, when the focal length of the zoom lens is changed from its minimum value to the maximum value, the illumination angle of the strobe device 1 becomes minimum before the focal length of the zoom strobe device 1 reaches the maximum value. While the projection 13a relatively moves with respect to the bending portion 151 to an end portion 152 of the cam groove 15s, only the focal length of the zoom lens changes and the illumination angle of the zoom strobe device 1 stays minimum and does not change.

While the cam plate 15 moves within the ranges L1 and L2, the reflector 13 moves in X1 direction together with the projection 13a. Ideally, the illumination angle of the zoom strobe device 1 changes in accordance with the change of the photographing angle (angle of view) of the zoom lens when the focal length of the zoom lens changes over the movable areas L1 and L2 of the cam plate 15. However, if the movable range of the zoom lens is relatively great, and the thickness of the camera body is relatively thin, it may be impossible to make .sufficient room for moving the reflector 13 to satisfy the above ideal condition. Due to the physical limitation (i.e., the thickness of the camera body), the movable amount of the reflector is limited to the amount D as shown in FIG. 2. In the conventional zoom strobe device, as indicated by broken lines PR in FIG. 2, the reflector moves such that the illumination angle becomes greatest when the focal length of the zoom lens is smallest, and that the illumination angle becomes smallest when the focal length of the Zoom lens is greatest, and the reflector is moved proportionally to the movement of the cam plate 15.

Figure 3:
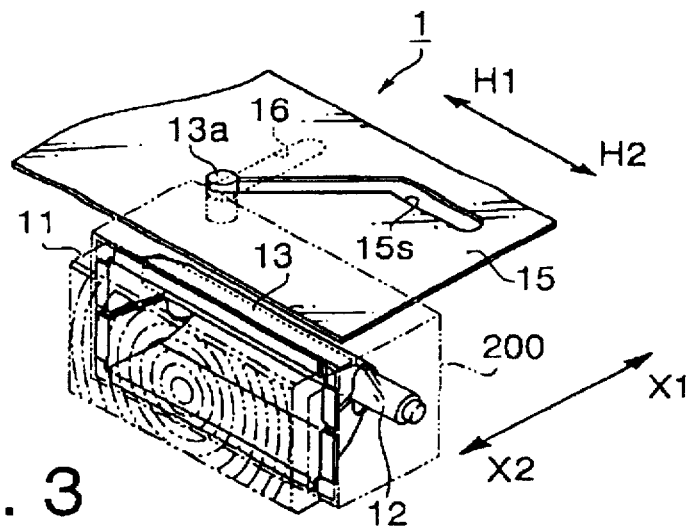
FIGS. 3, 4 and 5 are perspective views showing the positional relationship of a cam plate and the reflector in the first embodiment.
Figure 4:
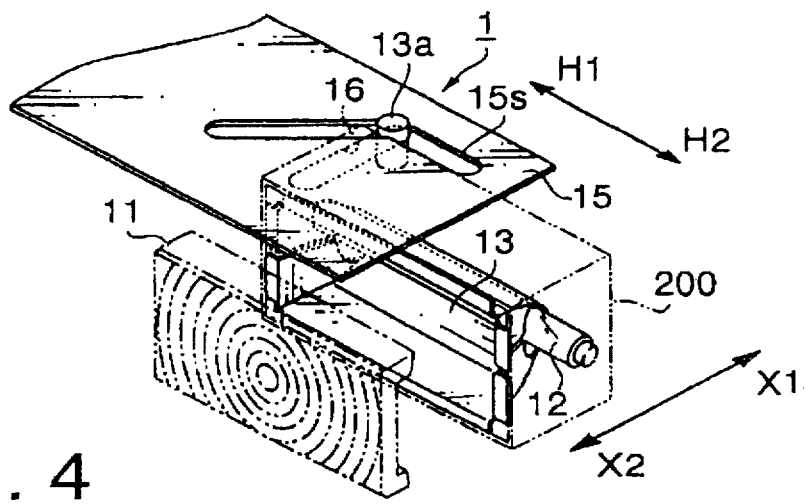
Figure 5:
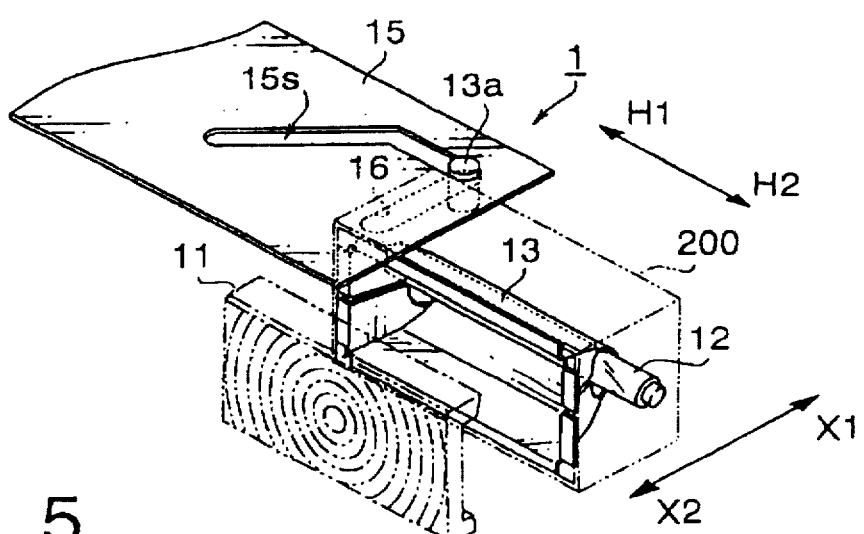

With reference to FIGS. 3 through 5, the movement of the reflector 13 with respect to the movement of the cam plate 15 will be described in detail.

FIG. 3 shows the status that the focal length of the zoom lens is the smallest and the reflector 13 and the discharging tube 12 are closest to the cover plate 11. From this status, when the focal length of the zoom lens is increased, the cam plate 15 moves in H1 direction, and corresponding to the movement of the cam plate 15, the reflector 13 and the discharging tube 12 move in X1 direction in accordance with the shape of the cam groove 15s until the projection 13a reaches the bending portion 151 (see FIG. 2). From the status shown in FIG. 3 to the status shown in FIG. 4, the reflector 13 and the discharging tube 12 move by the amount D (indicated in FIG. 2). In other words, the reflector 13 and the discharging tube 12 moves within the movable range D when the projection 13a moves relatively to the cam groove 15s within the area L1 (see FIG. 2).

From the status shown in FIG. 4, if the focal length of the zoom lens is further increased, the cam plate 15 further moves in H1 direction. As shown in FIG. 2, when the projection 13a moves from the bending portion 151 to the end portion 152 relative to the cam groove 15s, the reflector 13 and the discharging tube 12 do not move in the X2 direction. That is, between the status shown in FIG. 4 and FIG. 5, the reflector 13 and the discharging tube 12 are farthest from the cover plate 11 and regardless of the movement of the cam plate 15, or regardless of the change of the focal length of the zoom lens, the reflector 13 and the discharging tube 12 stay at the same position when the projection 13a moves within the area L2 (see FIG. 2).

Figure 6:
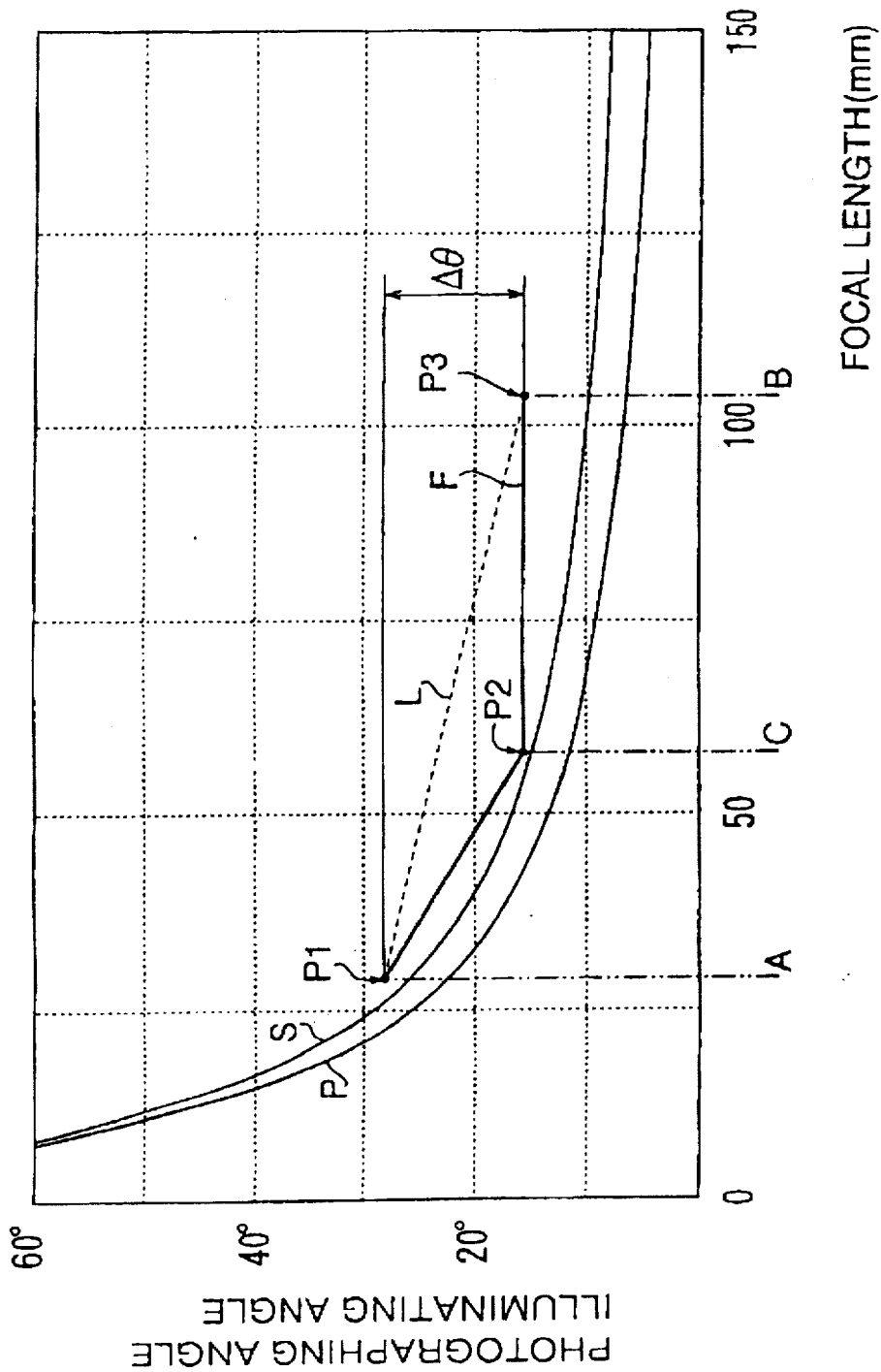
FIG. 6 is a graph indicating change of the illumination angle with respect to the change of the focal length of the zoom lens.

FIG. 6 is a graph showing the change of the light emitting angle of the strobe device, and the change of the photographing angle. Specifically, line P shows a change of the actual photographing angle of the zoom lens, line S shows the illumination angle defined by the Old Export Inspection Standard. Any zoom strobe device incorporated in a zoom lens camera is required to satisfy the above Old Export Inspection Standard, i.e., the zoom strobe device must have the same or greater illumination angle with respect to the angle defined by the Old Export Inspection Standard. The light emitting angle is expressed below.

In the direction of the longer side of the photographing frame:

$$\text{light emitting angle} = 2 \tan^{-1} \left( \frac{0.6 \times a \times 2^{(\frac{f_u - f_s}{4.5 \times f_s})}}{f_u \times 2^{(\frac{a-b}{4(a+b)})}} \right)$$

where, "$f_u$" is a focal length of the photographing lens; "$f_s$" is the focal length of the photographing lens at which a diagonal of the photographing frame is covered by a viewing angle of 50 degrees;

"a" is a size of a longer side of the photographing frame; and

"b" is a size of a shorter side of the photographing frame.

In the direction of the shorter side of the photographing frame:

$$\text{light emitting angle} = 2 \tan^{-1} \left( \frac{0.6 \times b \times 2^{(\frac{f_u - f_s}{4.5 \times f_s})}}{f_u \times 2^{(\frac{b-a}{4(a+b)})}} \right)$$

where, "$f_u$" is a focal length of the photographing lens; "$f_s$" is the focal length of the photographing lens at which a diagonal of the photographing frame is covered by a viewing angle of 50 degrees;

"a" is a size of a longer side of the photographing frame; and

"b" is a size of a shorter side of the photographing frame.

Line F shows the change of the illumination angle of the zoom strobe device 1 according to the embodiment. In the embodiment, the discharging tube 12 can be regarded as a linear light source extending in the direction of the longer side of the photographing frame. Therefore, the condition in the direction of the longer side of the photographing frame is considered to be satisfied, and only the condition in the direction of the shorter side of the photographing frame can be shown in FIG. 6 and to be examined.

In FIG. 6, broken line L shows the characteristic of the conventional zoom strobe device corresponding to the conventional cam groove movement shown by the broken line PR in FIG. 2. In the embodiment, the focal length of the zoom lens changes from a first focal length A to a second focal length B. The first focal length A is the focal length of length) the zoom lens when the zoom lens is located at the wide (shortest focal extremity, and the second focal length B is the focal length when the zoom lens is located at the tele (longest focal length) extremity. Within this area defined by the focal lengths A and B, the cam plate 15 moves in accordance with the movement of the zoom lens. Point P1 on the line F represents the illumination angle of the zoom strobe device 1 when the positional relationship of the cover plate 11, the cam plate 15, the discharging tube 12 and the reflector 13 is as shown in FIG. 3. Similarly, point P2 corresponds to FIG. 4, and point P3 corresponds to FIG. 5.

As shown in FIG. 6, the illumination angle of the zoom strobe device 1 changes from its minimum value to its maximum value between the points P1 and P2. That is, when the focal length of the zoom lens changes from the first focal length A to a third focal length C, the reflector 18 moves from the position where the reflector is closest to the cover plate 11 to the position where the reflector 18 is farthest from the cover plate 11, by the amount D. During this movement of the reflector 18, the changed amount of the illumination angle is Δθ as shown in FIG. 6.

As clearly shown in FIG. 6, the characteristic indicated by the line F is closer to the lines P and S than the conventional characteristic indicated by line L at any point within the range between A and B. Especially when the focal length of the zoom lens is C, the characteristic F is very close to the line S, and a significant effect can be achieved around this point P2.

Further description on the focal length C and the point P2 is provided hereinafter. The point P2 is a point corresponding to the minimum illumination angle of the zoom strobe device 1. The minimum illumination angle is determined depending on the shape of the reflector 13, the characteristics of the cover plate (Fresnel lens) 11, the movable range of the reflector 13 and the like. Ideally, the point C can be determined as a point on the line S corresponding to the minimum illumination angle. Practically, optical errors and assembling errors of the reflector 13 and the cover plate 11, and the like are taken into account, and the point C is determined as a point which has a slightly greater illumination angle than the ideal point. Once the point C is determined, the range L1 in FIG. 2 can be determined, and then the shape of the cam groove 15s can be determined.

In the embodiment described above, the change of the focal length of the zoom lens and change of the illumination angle within the changeable range are substantially proportional as shown in FIG. 6. In other words, the changing amount of the illumination angle with respect to a changing amount of the focal length is fixed. The characteristic indicated by line F between the points P1 and P2 is a straight line, points. P1 and P2 being close to the line S, and the line S is a downwardly convex curve, any point on the characteristic F is closer to the line S (or P) than the line L representing the conventional characteristic, as shown in FIG. 6.

In the above-described embodiment, the characteristic between the points P1 and P2 is represented by a straight line on the graph. However, the characteristic is not limited to the straight line, and can be a curved line which is more closer to the line S or P than the above-described line F within the range between the points P1 and P2. Such a strobe device can be achieved by using an appropriate lens for the cover plate 11. Alternatively, by using the same cover plate 11 and changing the shape of the cam groove 15s, the same effect can be achieved. The combination of both is also be possible. In the second embodiment described below, by changing the shape of the cam groove 15s, the above described characteristic is realized.

Figure 7:
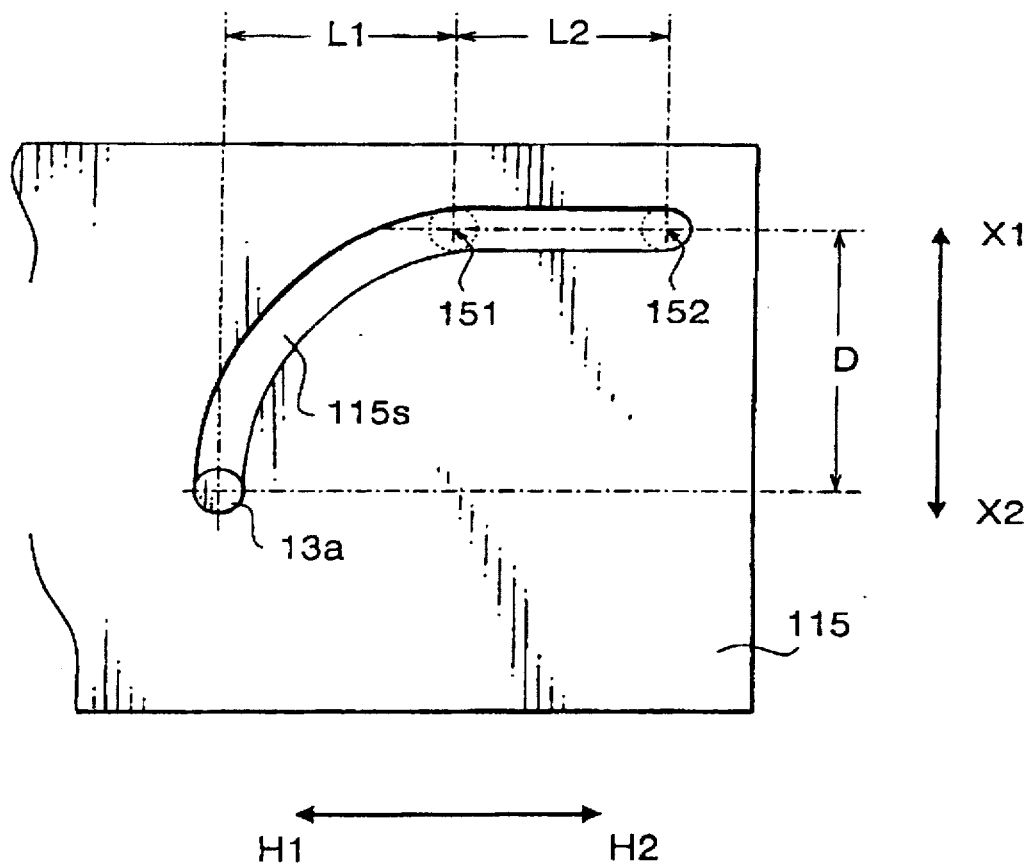
FIG. 7 shows a shape of a cam for driving a reflector employed in a second embodiment.

FIG. 7 shows a top view of a part of a cam plate 115 according to the second embodiment. The cam plate 115 has a cam groove 115s. In the second embodiment, only the shape of the cam groove 115s an attendant functions are different from the above-described first embodiment, and the following description will focus on the shape of the cam groove 115s.

Figure 8:
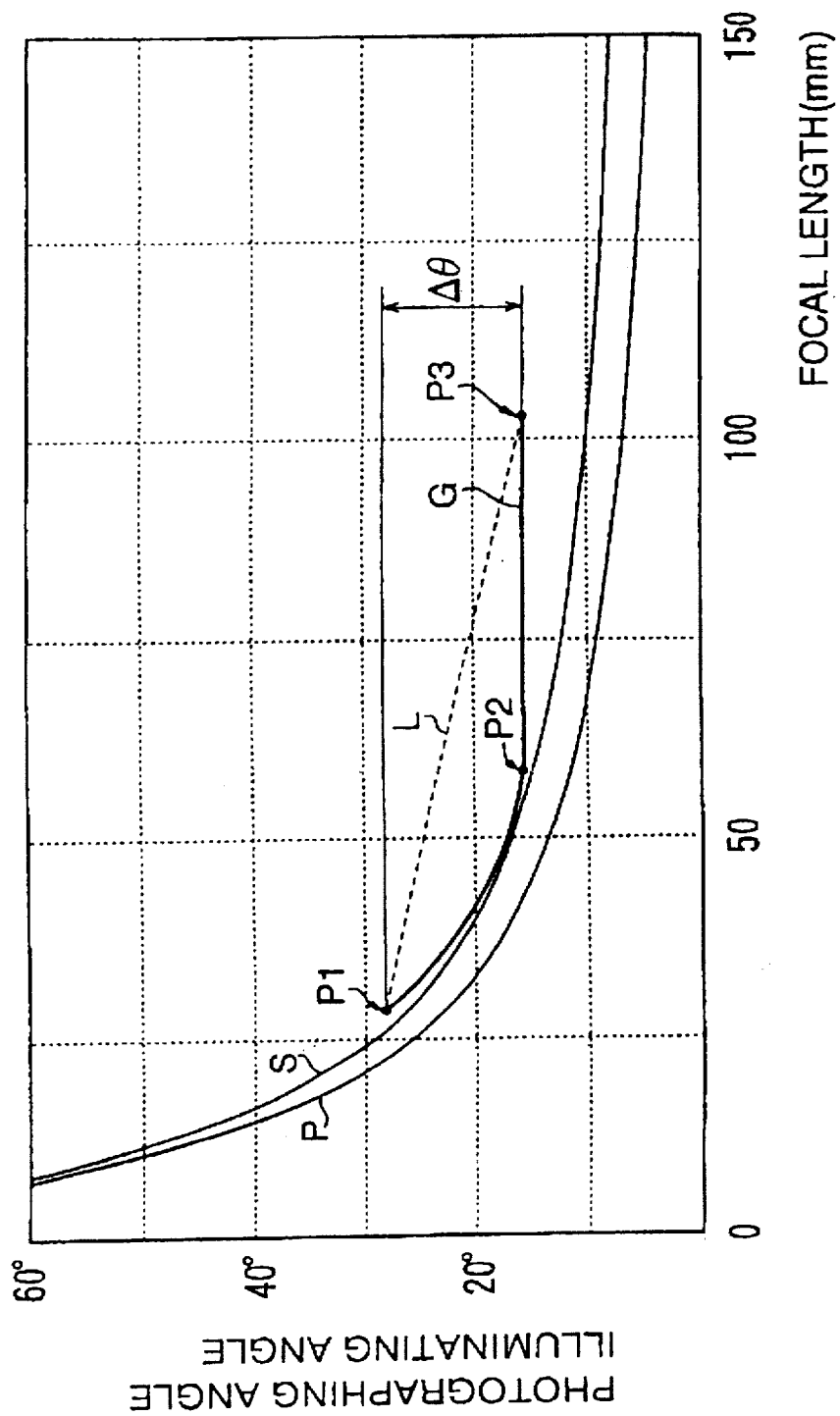
FIG. 8 is a graph indicating change of the illumination angle with respect to the change of the focal length of the zoom lens in the second embodiment.

As shown in FIGS. 7 and 8, within the range L1, the cam groove 115s is arc-shaped. Within the range L2, similarly to the first embodiment, the cam groove 115s extends in a direction parallel to the moving direction of the cam place 115.

When the projection 13a is located at an end of the cam groove 115s as shown in FIG. 7, the focal length of the zoom lens is at its minimum, i.e., the zoom lens is located at the wide extremity. The cam plate 115 can move relatively to the projection 13a. When the cam plate 115 is moved and the projection 13a is located at the point 151, the reflector 13 moves in the X1 direction by the amount D. When the projection 13a reaches the portion 151, the focal length of the zoom lens is between its minimum and maximum values. Then, if the cam plate 115 is further moved within the area L2, the reflector 13 does not move (i.e., the illumination angle is unchanged), but the focal length of the zoom lens changes. When the projection 13a reaches the end point 152 of the cam groove 115s, the focal length of the zoom lens becomes greatest, i.e., the zoom lens reaches the tele extremity.

In the first and second embodiments, the reflector 13 and the zoom lens are driven by the same drive source, using a cam mechanism. However, the structure is not limited to such a single-motor structure. For example, the zoom lens and the reflector can be driven by separate motors, i.e., independently.

As described above, according to the invention, when the changing amount of the photographing angle due to the change of the focal length of the zoom lens is greater than the changeable amount of illumination angle of the zoom strobe device, the changing characteristic of the illumination angle of the zoom strobe device approaches the characteristic of the photographing angle, and the light emitted by the strobe device is efficiently used. In other words, when the changeable range of the illumination angle is limited, the characteristic of change of the illumination angle can be optimized, and therefore the invention acts to decrease the size of cameras, and to increase the changeable range of the focal length of the zoom lens.

The present disclosure relates to subject matters contained in Japanese Patent Application No. HEI 7-210052, filed on Jul. 26, 1995, and Japanese Patent Application No. HEI 8-113145, filed on Apr. 10, 1996, which are expressly incorporated herein by reference in their entireties.

What is claimed is:

1. A zoom strobe device employed in a zoom lens camera, said zoom strobe device being capable of changing illumination angle in accordance with change of focal length of a zoom lens of said camera, said zoom strobe device comprising:

a light source for emitting light;

a lens for refracting said light emitted by said light source;

a reflector provided on an opposite side of said lens with respect to said light source, said reflector reflecting light emitted by said light source to be directed to said lens; and a drive mechanism for changing said illumination angle, wherein said focal length of said zoom lens changes from a first focal length to a second focal length which is greater than said first focal length, and wherein said drive mechanism changes said illumination angle when said focal length of said zoom lens changes between said first focal length and a third focal length which is greater than said first focal length and smaller than said second focal length, while said drive mechanism maintains said illumination angle when said focal length of said zoom lens changes between said third focal length and said second focal length.

2. The zoom strobe device according to claim 1, wherein said driving mechanism comprises a distance changing device for changing a distance between said reflector and said lens in order to change said illumination angle, and wherein said distance changing device changes said distance between said reflector and said lens when said focal length of said zoom lens changes between said first focal length and said third focal length, while said distance changing device maintains said distance between said reflector and said lens when said focal length of said zoom lens changes between said third focal length and said second focal length.

3. The zoom strobe device according to claim 1, wherein said illumination angle is changeable within a predetermined changeable angle range, and wherein when said focal length of said zoom lens is at said first focal length, said illumination angle is set to be a maximum angle of said changeable angle range, and when said focal length is said second focal length, said illumination angle is set to be a minimum angle of said changeable angle range.

4. The zoom strobe device according to claim 3, wherein said change of said illumination angle follows a change of said focal length of said zoom lens as said focal length changes between said first and third focal lengths.

5. The zoom strobe device according to claim 3, wherein said change of said illumination angle corresponds to a change in a photographing angle of said zoom lens as said focal length changes between said first and third focal lengths.

6. The zoom strobe device according to claim 5, wherein a difference between said photographing angle and said illumination angle is maintained when said focal length of said zoom lens is within a range between said first focal length and said third focal length.

7. The zoom strobe device according to claim 6, wherein a cam plate moves in accordance with said change of said focal length of said zoom lens.

8. The zoom strobe device according to claim 3, wherein a difference between a photographing angle of said zoom lens and said illumination angle when said focal length of said zoom lens is one of said first and said third focal lengths is smaller than a difference between said photographing angle and said illumination angle when said focal length of said zoom lens is within a range between said third focal length and said second focal length.

9. The zoom strobe device according to claim 1, wherein said reflector is movable in a direction of an optical axis of said lens, and wherein said drive mechanism includes: a projecting member connected to said reflector; and a cam plate having a cam groove to be engaged with said projecting member, said cam plate being movable in a direction perpendicular to said direction of said optical axis of said lens.

10. The zoom strobe device according to claim 1, wherein said light source and said reflector are movable as a unit.

11. A zoom strobe device employed in a zoom lens camera, said zoom strobe device being capable of changing illumination angle in accordance with change of focal length of a zoom lens of said camera, said zoom strobe device comprising:

a light source for emitting light;

a lens for refracting said light emitted by said light source;

a reflector provided on an opposite side of said lens with respect to said light source, said reflector reflecting light emitted by said light source to be directed to said lens; and a drive mechanism for changing a distance between said reflector and said lens in order to change said illumination angle, wherein said drive mechanism changes said distance between said reflector and said lens when said focal length of said zoom lens changes between a minimum focal length and a predetermined focal length which is greater than said minimum focal length and smaller than a maximum focal length of said zoom lens, while said drive mechanism maintains said distance between said reflector and said lens when said focal length of said zoom lens changes between said predetermined focal length and said maximum focal length.

\* \* \* \* \*